US008139754B2

(12) United States Patent
Aghara et al.

(10) Patent No.: US 8,139,754 B2
(45) Date of Patent: Mar. 20, 2012

(54) CORRELATING CALL LOG FILES USING VOICE PRINTS (75) Inventors: Amit Aghara, Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/582,387

(22) Filed: Oct. 20, 2009

(65) Prior Publication Data

US 2011/0091020 A1     Apr. 21, 2011

(51) Int. Cl.
*H04M 5/00* (2006.01)
*H04M 1/64* (2006.01)

(52) U.S. Cl. .................. 379/265.02; 379/88.02

(58) Field of Classification Search .............. 379/67.1, 379/88.04–88.25, 265.01–265.05, 2, 211.01, 379/69, 114.01, 256.06
See application file for complete search history.

(56) References Cited

U.S. PATENT DOCUMENTS

| | | | |
|---|---|---|---|
| 6,385,609 B1 * | 5/2002 | Barshefsky et al. | 1/1 |
| 6,711,254 B2 * | 3/2004 | Sato et al. | 379/265.02 |
| 6,731,725 B1 * | 5/2004 | Merwin et al. | 379/88.23 |
| 6,879,965 B2 | 4/2005 | Fung et al. | |
| 7,333,601 B2 * | 2/2008 | Sato et al. | 379/265.02 |
| 7,788,102 B1 * | 8/2010 | McIntosh | 704/273 |
| 7,995,710 B2 * | 8/2011 | Sato et al. | 379/68 |
| 2002/0051530 A1 * | 5/2002 | Sato et al. | 379/265.01 |
| 2004/0136518 A1 * | 7/2004 | Sato et al. | 379/265.02 |
| 2006/0277043 A1 | 12/2006 | Tomes et al. | |
| 2006/0289622 A1 | 12/2006 | Khor et al. | |
| 2007/0019800 A1 * | 1/2007 | Bushey et al. | 379/211.01 |
| 2007/0206772 A1 * | 9/2007 | Sato et al. | 379/265.02 |
| 2008/0082536 A1 | 4/2008 | Schwabe et al. | |
| 2008/0312924 A1 | 12/2008 | De Los Reyes et al. | |
| 2010/0020943 A1 * | 1/2010 | Hasegawa | 379/69 |

OTHER PUBLICATIONS

International Searching Authority, International Search Report and Written Opinion for International Application No. PCT/EP2010/062692, Dec. 1, 2010, pp. 1-14.
Markowitz, JA, "Voice Biometrics" Communications of the ACM, Sep. 2000, pp. 66-73, vol. 43, No. 9.
Anonymous, "Using Enterprise Server to Identify Callers With Voice-ID" Nov. 28, 2007, pp. 1-2, IP.COM No. IPCOM000160769D.
Jutla et al. "Adding User-Level Space: Security, Privacy, and Context to Intelligent Multimedia Information Sources" Proceedings of the 2006 IEEE/WIC/ACM International Conference on Web Intelligence and Intelligent Agent Technology, pp. 1-8.

* cited by examiner

*Primary Examiner* — Davetta W Goins
*Assistant Examiner* — Mohammad Islam
(74) *Attorney, Agent, or Firm* — John R. Pivnichny; Law Office of Jim Boice (57) ABSTRACT A system is presented for logging and recording a call to a call network. The system comprises a voice print logic for generating a voice print of a caller who is making a call to a call network. A telecom routing switch generates a correlated telecom router switch log file by appending the voice print of the caller to a telecom router switch log file for the call. A telecom software system generates a correlated telecom software system log file by appending the voice print of the caller to a telecom software system log file for the call. A contact center agent generates a correlated contact center agent log file by appending the voice print of the caller to a contact center agent log file for the call. The voice print is utilized to retrieve and to consolidate the correlated telecom router switch log file, the correlated telecom software system log file, and the correlated contact center agent log file into a single correlated file for the call.

20 Claims, 5 Drawing Sheets

CORRELATING CALL LOG FILES USING VOICE PRINTS

BACKGROUND

The present disclosure relates to the field of telecommunications, and specifically to the management of calls to call networks. Still more particularly, the present disclosure relates to logging and storing log files related to calls made to call networks.

BRIEF SUMMARY

In one embodiment, a system is presented for logging and recording a call to a call network. The system comprises a voice print logic for generating a voice print of a caller who is making a call to a call network. A telecom routing switch generates a correlated telecom router switch log file by appending the voice print of the caller to a telecom router switch log file for the call. A telecom software system generates a correlated telecom software system log file by appending the voice print of the caller to a software system log file for the call. A contact center agent generates a correlated contact center agent log file by appending the voice print of the caller to a contact center agent log file for the call. The voice print is utilized to retrieve and to consolidate the correlated telecom router switch log file, the correlated telecom software system log file, and the correlated contact center agent log file into a single correlated log file for the call.

In one embodiment, a computer-implemented method and computer program product for correlating a call log file in a call network is presented. A call network receives a call from a caller, and generates a voice print of the caller. A correlated telecom router switch log file, which comprises the voice print of the caller and a telecom router switch log file for the call, is generated. A correlated telecom software system log file, which comprises the voice print of the caller and a telecom software system log file for the call, is generated. A correlated contact center agent log file, which comprises the voice print of the caller and a contact center agent log file for the call, is generated. The voice print is then utilized to retrieve and to consolidate the correlated telecom router switch log file, the correlated telecom software system log file, and the correlated contact center agent log file into a single correlated log file.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
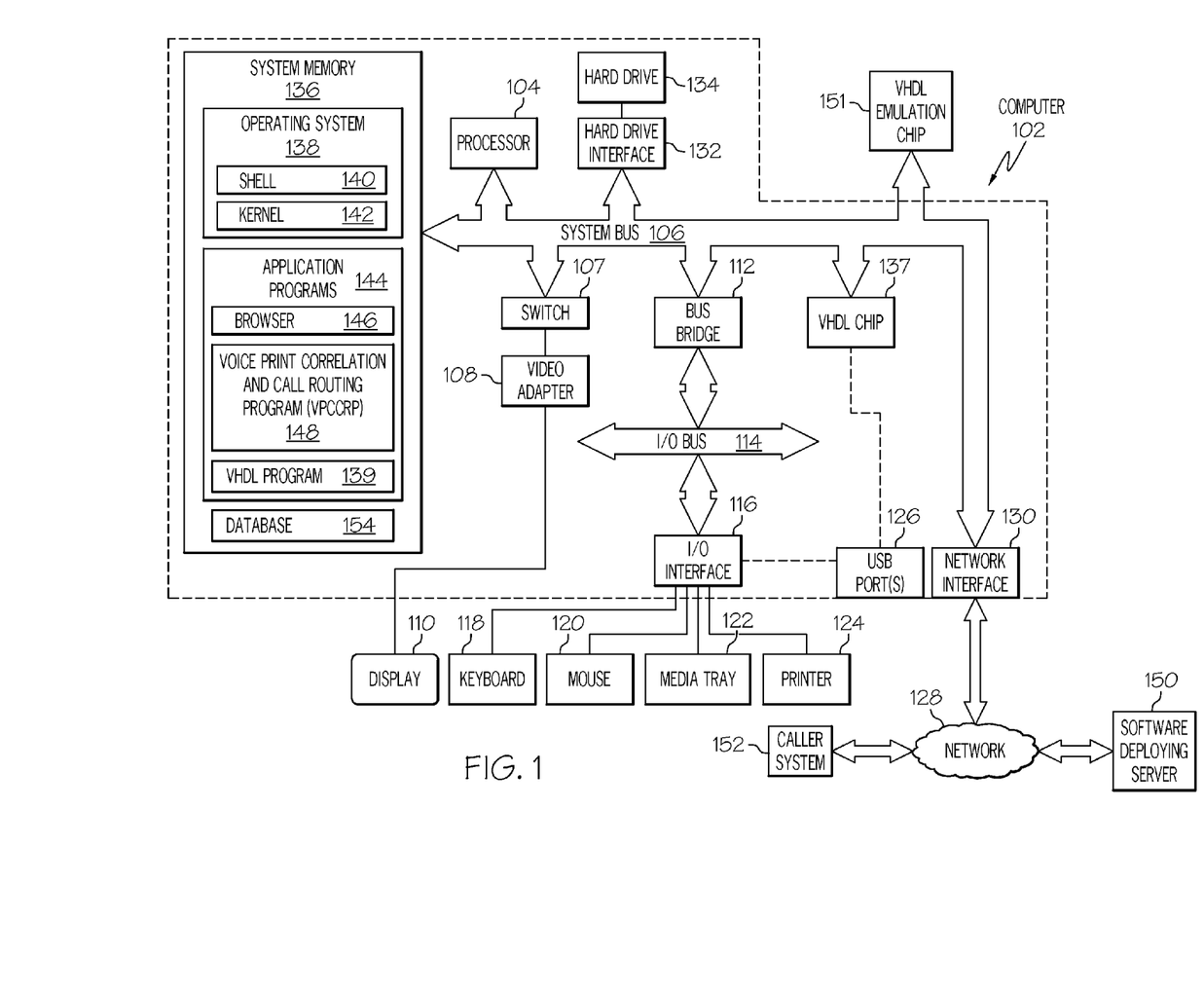
FIG. 1 depicts an exemplary computer in which all or some elements of the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or caller system 152, as well as the telecom router switch 306, telecom software system 314, contact center agent 320, and system administrator 400 shown in FIG. 4.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., voice print correlation and call routing program VPCCRP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a voice print correlation and call routing program (VPCCRP) 148. VPCCRP 148 includes code for implementing the processes described below, including those described in FIGS. 3-5. In one embodiment, computer 102 is able to download VPCCRP 148 from software deploying server 150, including in an on-demand basis. Note further that, in one embodiment of the present invention, software deploying server 150 performs all of the functions associated with the present invention (including execution of VPCCRP 148), thus freeing computer 102 from having to use its own internal computing resources to execute VPCCRP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VPCCRP 148 causes VHDL program 139 to configure VHDL chip 137, which may be an FPGA, ASIC, etc.

In another embodiment of the present invention, execution of instructions from VPCCRP 148 results in a utilization of VHDL program 139 to program a VHDL emulation chip 151. VHDL emulation chip 151 may incorporate a similar architecture as described above for VHDL chip 137. Once VPCCRP 148 and VHDL program 139 program VHDL emulation chip 151, VHDL emulation chip 151 performs, as hardware, some or all functions described by one or more executions of some or all of the instructions found in VPCCRP 148. That is, the VHDL emulation chip 151 is a hardware emulation of some or all of the software instructions found in VPCCRP 148. In one embodiment, VHDL emulation chip 151 is a programmable read only memory (PROM) that, once burned in accordance with instructions from VPCCRP 148 and VHDL program 139, is permanently transformed into a new circuitry that performs the functions needed to perform the process described below in FIGS. 3-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
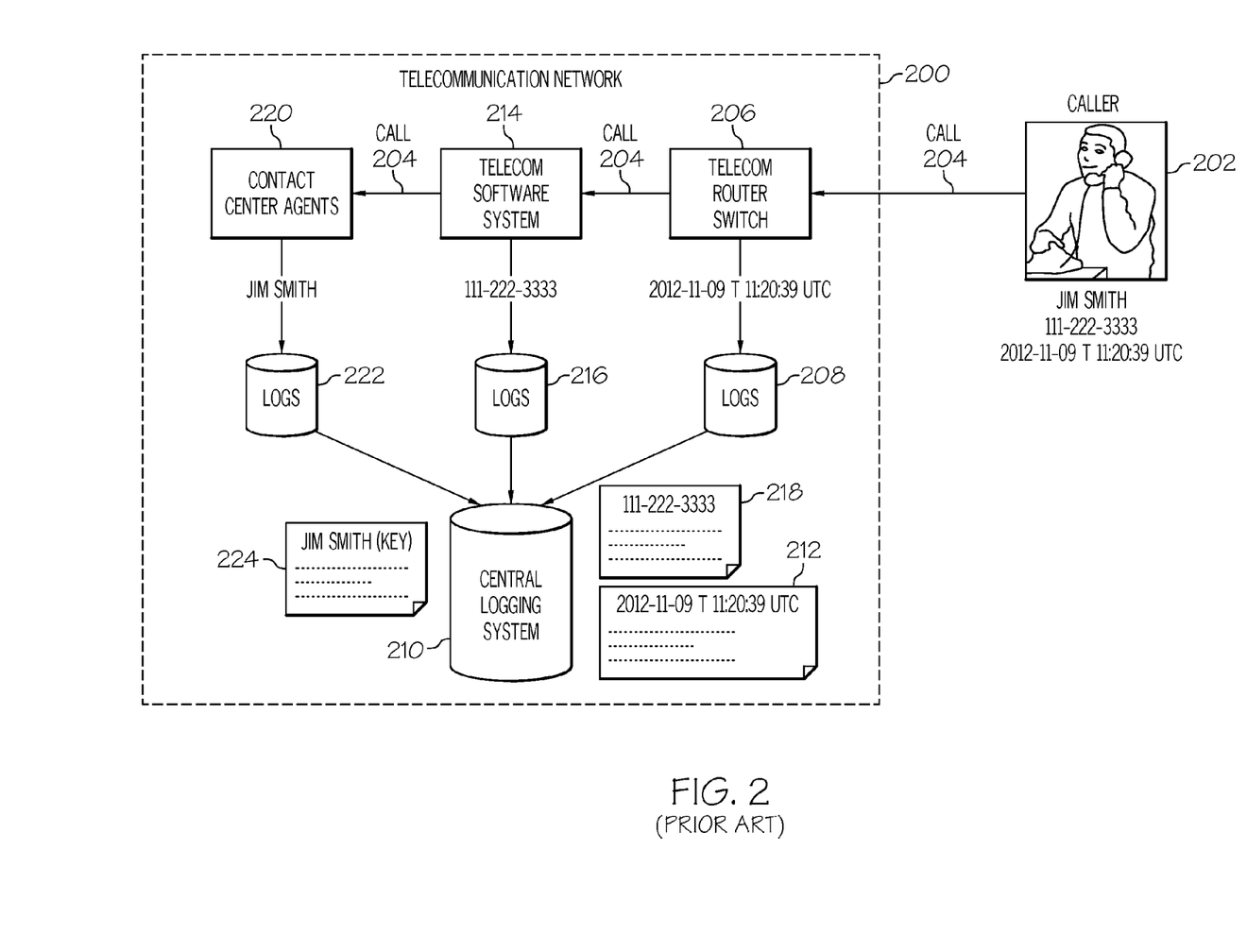
FIG. 2 illustrates prior-art steps taken to log a call into a telecommunication network.

With reference now to FIG. 2, a prior art telecommunication network 200 is presented. Assume that a caller 202 has placed a call 204 to the telecommunication network 200, which may be a contact center network, a call center network, or any other network designed to handle phone calls from multiple customers, clients, users, etc., and to direct them to a person, software or other agent, in accordance with the nature of their call. The call 204 is first received by a telecom router switch 206, which identifies the time and date of the call 204 while the call 204 is being handled by the telecommunication network 200. This information is logged into a log 208, and is then passed on to and stored in a central logging system 210 as a telecom router switch log file 212. The call 204 is then passed on to a telecom software system 214, which may be an interactive voice response (IVR) system or any other software system designed to pass the call to the appropriate resource within telecommunication network 200. Telecom software system 214 generates a telecom software system log file, which identifies the telephone number of the caller 202. This telecom software system log file is stored in a local log 216, and then passed on to and stored in the central logging system 210 as a telecom software system log file 218. Finally, the call 204 is passed on to a contact center agent 220, which is software and/or a person that identifies the name of the caller. The contact center agent 220 stores this name information as a contact center agent log file in a local log 222, and then passes it on for storage in the central logging system 210 as a contact center agent log file 224. As depicted, the telecom router switch log file 212, the telecom software system log file 218, and the contact center agent log file 224 are all separate files with no common identifiers. Thus, there is no way to know that these three log files are for the same call 204.

Figure 3:
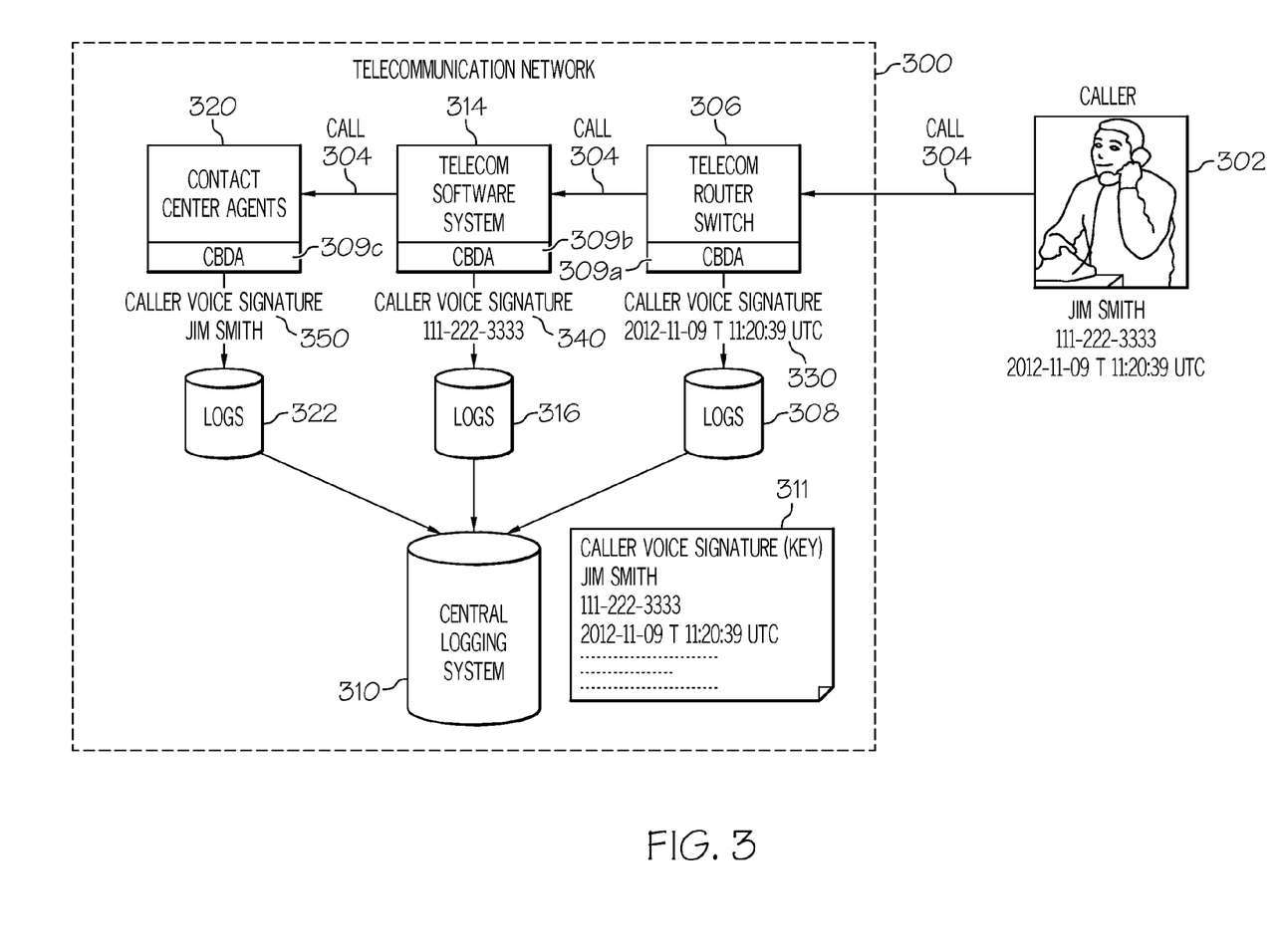
FIG. 3 depicts appending a caller's voice print to a call's log file in the telecommunication network in order to create a single correlated log file for the call.

With reference now to FIG. 3, an improved and novel telecommunication network 300 is depicted. Telecommunication network 300 may be a contact center network, a call center network, or any other network designed to handle phone calls from multiple customers, clients, users, etc., and to direct them to a person, software or other agent, in accordance with the nature of their call. A call 304 from a caller 302 is first received by a telecom router switch 306, which identifies the time and date of the call 304 while the call 304 is being handled by the telecommunication network 300. Within telecom router switch 306 is voice print logic, shown as a conversational biometric distributor and authenticator (CDBA) 309a. CDBA 309a is able to take a voice print of caller 304. This voice print can be created by prompting the caller to state his name, any baseline word or phrase, or any other word or phrase. This voice print is digitized into a numeric value and appended to the telecom router switch log file 212, which was described in FIG. 2, to generate a correlated telecom router switch log file 330, which is stored in the local log 308 and then passed on to the central logging system 310.

The call 304 is then passed on to a telecom software system 314, which may be an interactive voice response (IVR) system or any other software system designed to pass the call to the appropriate resource within telecommunication network 300. Telecom software system 314 generates a telecom software system log file, which identifies the telephone number of the caller 302, and then appends the voice print, which was generated earlier by telecom router switch 306, to generate a correlated telecom software system log file 340. This correlated telecom software system log file 340 is stored in a local log 316, and is then passed on to and stored in the central logging system 310. Finally, the call 304 is passed on to a contact center agent 320, which is software and/or a person that identifies the name of the caller and stores this name information along with the voice print in a local log 322 as a correlated contact center agent log file 350. The contact center agent 320 stores this correlated contact center agent log file 350 in a local log 322, and then passes it on for storage in the central logging system 310. The central logging system 310 utilizes the voice print found in all three log files to locate the consolidated files (330, 340, 350) in order to generate a single correlated log file 311 for the call 304 that contains the information in these consolidated files (330, 340, 350).

Note that while the voice print is described as being generated by the CDBA 309a in the telecom router switch 306, in one embodiment voice prints can be generated by CDBA 309b in telecom software system 314 and by CDBA 309c in contact center agent 320. These multiple voice prints thus provide additional voice print data, which can be consolidated into a single voice print by the central logging system 310. This consolidated single voice print is able to identify the voice prints generated by all of the CDBAs 309a-c, thus providing means for identifying all of the three correlated call logs, while allowing each of the three correlated call logs to maintain their own unique voice prints.

Figure 4:
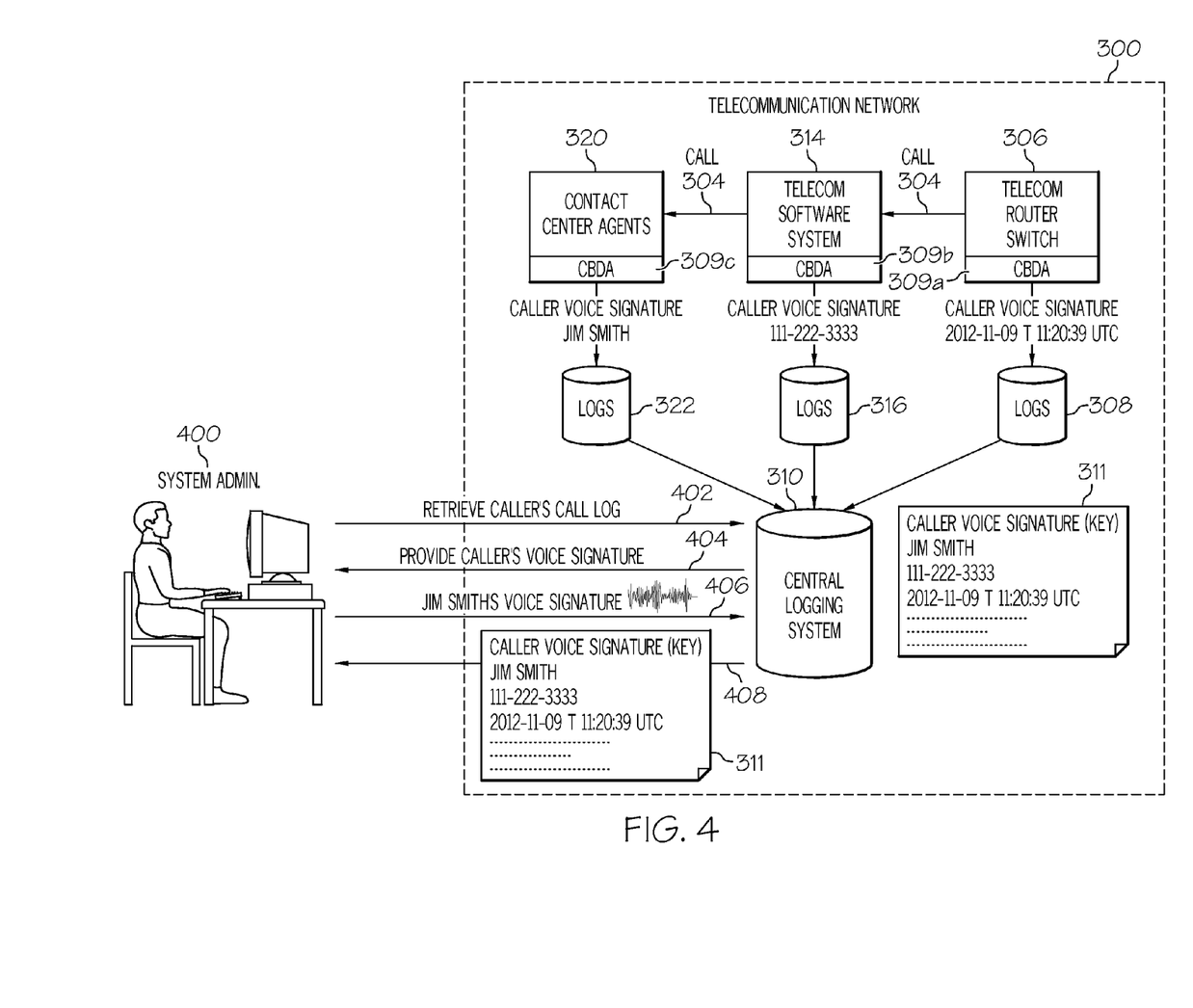
FIG. 4 illustrates a system manager utilizing the single correlated log file when requesting information about the call.

With reference now to FIG. 4, assume that a user of a computer depicted as system administrator 400 desires to perform an analysis of calls received at the telecommunication network 300. The user of system administrator 400 needs only to know information about when the call 304 was processed, the phone number of the caller 302, or the name of the caller 302. By knowing any of these three items, the system administrator 400 is able to retrieve all three sets of data, since they are now consolidated and correlated into the single correlated log file 311. Thus, the system administrator 400 can send a request to retrieve the caller's call log (step 402) using any of the three data elements (caller's name, phone number, or date/time of call). In one embodiment, only the voice print is returned to the system administrator (step 404). The system administrator 400 can then use this voice print (voice signature) to request all logs (step 406) that have this voice print appended to the log (as described above). The central logging system 310 can then return the single correlated log file 311, as shown in step 408.

Figure 5:
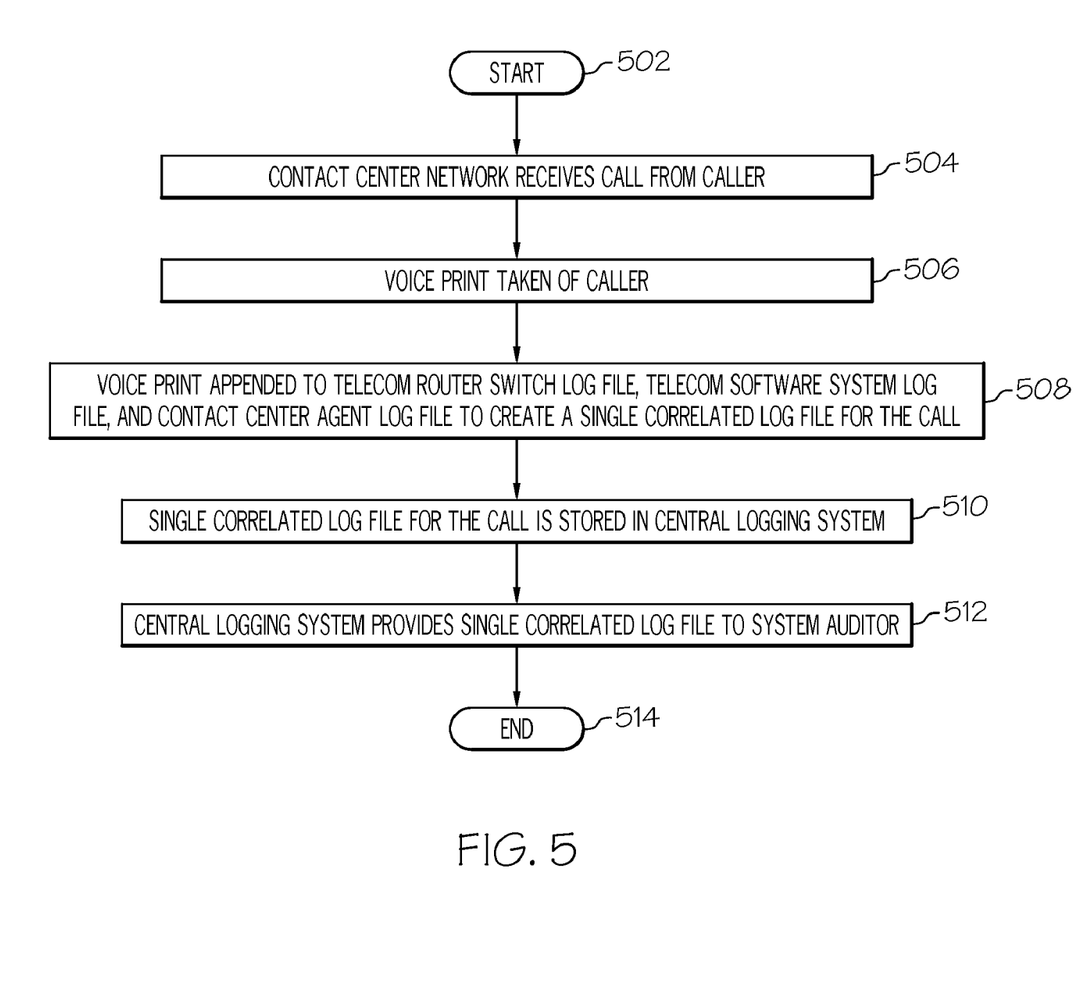
FIG. 5 is a high-level flow-chart of exemplary steps taken to utilize a caller's voice print to identify and correlate calling log data for a call to a network.

With reference now to FIG. 5, a high-level flow chart of exemplary steps taken to correlate log files in a call network is presented. After initiator block 502, a call network (e.g., a contact center network) receives a call from a caller (block 504). A voice print of the caller is generated (block 506), and is appended to the telecom router switch log file (to generate a correlated telecom router switch log file), the telecom software system log file (to generate a correlated telecom software system log file), and the contact center agent log file (to generate a correlated contact center agent log file) as described above. These three voice print-augmented correlated log files are then consolidated into a single correlated log file for the call (block 508). The single correlated log file for the call is stored in a central logging system (block 510), which provides the single correlated log file to any requester (block 512), such as a system auditor, a system manager, etc. The process ends at terminator block 514.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A system for logging and recording a call to a call network, the system comprising:
    a voice print logic for generating a voice print of a caller, wherein the caller makes a call to a call network;
    a telecom routing switch for generating a correlated telecom router switch log file for the call, wherein the correlated telecom router switch log file comprises the voice print of the caller and a telecom router switch log file for the call;
    a telecom software system for generating a correlated telecom software system log file for the call, wherein the correlated telecom software system log file comprises the voice print of the caller and a software system log file for the call;
    a contact center agent for generating a correlated contact center agent log file for the call, wherein the correlated contact center agent log file comprises the voice print of the caller and a contact center agent log file for the call; and
    a computer for utilizing the voice print to retrieve and to consolidate the correlated telecom router switch log file, the correlated telecom software system log file, and the correlated contact center agent log file into a single correlated log file for the call.

2. The system of claim 1, wherein the telecom router switch log file comprises a time and date during which the call is processed in the call network.

3. The system of claim 1, wherein the telecom software system log file comprises responses to an interactive voice response (IVR) system used to direct the call to a particular agent in the call network.

4. The system of claim 1, wherein the contact center agent log file comprises a name of the caller.

5. The system of claim 1, wherein the call network is a contact center network.

6. The system of claim 1, further comprising:
    a central logging system for cataloging and storing the single correlated file.

7. A computer-implemented method of correlating call log files in a call network, the computer-implemented method comprising:
    a call network receiving a call from a caller;
    generating a voice print of the caller;
    generating a correlated telecom router switch log file for the call, wherein the correlated telecom router switch log file comprises the voice print of the caller and a telecom router switch log file for the call;
    generating a correlated telecom software system log file for the call, wherein the correlated telecom software system log file comprises the voice print of the caller and a software system log file for the call;
    generating a correlated contact center agent log file for the call, wherein the correlated contact center agent log file comprises the voice print of the caller and a contact center agent log file for the call; and
    executing instructions in a computer to utilize the voice print to retrieve and to consolidate the correlated telecom router switch log file, the correlated telecom software system log file, and the correlated contact center agent log file into a single correlated log file for the call.

8. The computer-implemented method of claim 7, wherein the telecom router switch log file comprises a time and date during which the call is processed in the call network.

9. The computer-implemented method of claim 7, wherein the telecom software system log file comprises responses to an interactive voice response (IVR) system used to direct the call to a particular agent in the call network.

10. The computer-implemented method of claim 7, wherein the contact center agent log file comprises a name of the caller.

11. The computer-implemented method of claim 7, wherein the call network is a contact center network.

12. The computer-implemented method of claim 7, further comprising:
cataloging and storing the single correlated file into a central logging system.

13. The computer-implemented method of claim 12, further comprising:
receiving, from a requester, a request for the telecom router switch log file, the telecom software system log file, or the telecom software system log file;
correlating the telecom router switch log file, the telecom software system log file, or the telecom software system log file with the single correlated log file; and
responding to the request by transmitting the single correlated log file to the requester.

14. A computer program product for correlating call log files in a call network, the computer program product comprising:
a computer readable storage media;
first program instructions to receive a call from a caller;
second program instructions to generate a voice print of the caller;
third program instructions to generate a correlated telecom router switch log file for the call, wherein the correlated telecom router switch log file comprises the voice print of the caller and a telecom router switch log file for the call;
fourth program instructions to generate a correlated telecom software system log file for the call, wherein the correlated telecom software system log file comprises the voice print of the caller and a software system log file for the call;
fifth program instructions to generate a correlated contact center agent log file for the call, wherein the correlated contact center agent log file comprises the voice print of the caller and a contact center agent log file for the call; and
sixth program instructions to utilize the voice print to retrieve and consolidate the correlated telecom router switch log file, the correlated telecom software system log file, and the correlated contact center agent log file into a single correlated file for the call, and wherein said first, second, third, fourth, fifth, and sixth program instructions are stored on said computer readable storage media.

15. The computer program product of claim 14, wherein the telecom router switch log file comprises a time and date during which the call is processed in the call network.

16. The computer program product of claim 14, wherein the telecom software system log file comprises responses to an interactive voice response (IVR) system used to direct the call to a particular agent in the call network.

17. The computer program product of claim 14, wherein the contact center agent log file comprises a name of the caller.

18. The computer program product of claim 14, wherein the call network is a contact center network.

19. The computer program product of claim 14, further comprising:
seventh program instructions to catalogue and store the single correlated file into a central logging system.

20. The computer program product of claim 14, wherein the first, second and third program instructions are downloaded to a client computer from a software deploying server in an on-demand basis.

* * * * *